United States Patent
Schoeley et al.

(10) Patent No.: US 8,207,260 B2
(45) Date of Patent: Jun. 26, 2012

(54) CROSS-LINKABLE MASSES BASED ON ORGANOSILICON COMPOUNDS

(75) Inventors: Peter Schoeley, Diera-Zehren (DE); Uwe Scheim, Coswig (DE); Otto Schneider, Burghausen (DE)

(73) Assignee: Wacker Chemie AG, Munich (DE)

( * ) Notice: Subject to any disclaimer, the term of this patent is extended or adjusted under 35 U.S.C. 154(b) by 245 days.

(21) Appl. No.: 12/671,606

(22) PCT Filed: Jul. 29, 2008

(86) PCT No.: PCT/EP2008/059929
§ 371 (c)(1),
(2), (4) Date: Feb. 1, 2010

(87) PCT Pub. No.: WO2009/019166
PCT Pub. Date: Feb. 12, 2009

(65) Prior Publication Data
US 2011/0224367 A1     Sep. 15, 2011

(30) Foreign Application Priority Data
Aug. 7, 2007 (DE) .......................... 10 2007 037 198

(51) Int. Cl.
C08L 83/08 (2006.01)
C08G 77/26 (2006.01)

(52) U.S. Cl. .............................. 524/588; 528/33; 528/38

(58) Field of Classification Search .......................... None
See application file for complete search history.

(56) References Cited

U.S. PATENT DOCUMENTS

| | | | | |
|---|---|---|---|---|
| 3,174,987 A * | 3/1965 | Kauczor et al. | ................ | 556/423 |
| 3,404,168 A * | 10/1968 | Schnurrbusch et al. | ...... | 556/420 |
| 3,522,199 A * | 7/1970 | Mueller et al. | ................ | 524/591 |
| 3,658,864 A * | 4/1972 | Golitz et al. | ................... | 556/420 |
| 4,093,641 A * | 6/1978 | Plueddemann | ................ | 556/405 |
| 4,461,867 A * | 7/1984 | Surprenant | ..................... | 524/788 |
| 4,579,636 A * | 4/1986 | Inoue et al. | ..................... | 522/99 |
| 4,689,085 A * | 8/1987 | Plueddemann | .......... | 106/287.14 |
| 4,735,971 A * | 4/1988 | Inoue et al. | ..................... | 522/42 |
| 4,742,092 A * | 5/1988 | Inoue et al. | ..................... | 522/27 |
| 5,093,454 A * | 3/1992 | Fujimoto et al. | ................ | 528/34 |
| 5,597,882 A * | 1/1997 | Schiller et al. | .................. | 528/18 |
| 5,753,720 A * | 5/1998 | Nakanishi et al. | ............. | 522/33 |
| 5,821,290 A * | 10/1998 | Labauze | ....................... | 524/188 |
| 5,847,145 A * | 12/1998 | Munzenberg et al. | ......... | 548/110 |
| 6,001,948 A | 12/1999 | Scheim et al. | | |
| 6,037,434 A * | 3/2000 | De Buyl et al. | ................ | 528/34 |
| 6,096,394 A * | 8/2000 | Jenkner et al. | ................ | 428/34.7 |
| 6,413,446 B1 * | 7/2002 | Mechtel et al. | ................ | 252/181 |
| 6,984,707 B2 * | 1/2006 | Ziche et al. | .................... | 528/18 |
| 7,491,784 B2 * | 2/2009 | Schafer et al. | .................. | 528/30 |
| 2001/0027233 A1 * | 10/2001 | Kobayashi et al. | ........... | 524/588 |
| 2004/0087752 A1 | 5/2004 | Schindler et al. | | |
| 2004/0181025 A1 * | 9/2004 | Schindler et al. | .............. | 528/38 |
| 2005/0085612 A1 * | 4/2005 | Schafer et al. | .................. | 528/34 |
| 2005/0272895 A1 * | 12/2005 | Ziche et al. | .................... | 528/30 |
| 2006/0035129 A1 * | 2/2006 | Nomura et al. | .................. | 429/33 |
| 2006/0258820 A1 * | 11/2006 | Schneider | ..................... | 525/477 |
| 2007/0232729 A1 | 10/2007 | Briehn et al. | | |
| 2008/0064813 A1 * | 3/2008 | Schneider | ..................... | 524/837 |
| 2009/0012322 A1 * | 1/2009 | Bockholt et al. | ............... | 556/421 |

FOREIGN PATENT DOCUMENTS

| | | |
|---|---|---|
| CN | 1202506 A | 12/1998 |
| EP | 0595531 B1 | 12/1998 |
| EP | 0885931 A2 | 12/1998 |
| EP | 1370602 B1 | 8/2004 |
| KR | 10-2007-0007363 A | 1/2007 |
| WO | 2005108495 A2 | 11/2005 |
| WO | WO 2006119916 A1 * | 11/2006 |

\* cited by examiner

*Primary Examiner* — Robert S Loewe
(74) *Attorney, Agent, or Firm* — Brooks Kushman P.C.

(57) ABSTRACT

Two or multi-component condensation curing compositions can be cured in deep sections with low shrinkage, yet require no tin catalysts, or a significantly reduced tin catalyst level.

17 Claims, No Drawings

CROSS-LINKABLE MASSES BASED ON ORGANOSILICON COMPOUNDS

CROSS-REFERENCE TO RELATED APPLICATION

This application is the U.S. national phase of PCT Appln. No. PCT/EP2008/059929 filed Jul. 29, 2008 which claims priority to German application DE 10 2007 037 198.7 filed Aug. 7, 2007.

BACKGROUND OF THE INVENTION

1. Field of the Invention

The invention relates to materials crosslinkable at room temperature by condensation reaction to give permanently resilient materials, and based on organosilicon compounds in the form of multicomponent systems, processes for the preparation thereof and the use thereof.

2. Description of the Related Art

Systems crosslinkable at room temperature by condensation reaction to give resilient materials and based on organosilicon compounds having hydrolyzable groups are known. They are provided as so-called one-component systems (RTV-1) and two-component systems (RTV-2) for the processor. The difference between the two systems is in particular that one-component systems cure slowly by diffusion of atmospheric humidity from the surface into deeper layers, whereas two-component systems crosslink very rapidly even in deep layers after mixing of the two components. The readily processable one-component systems are accordingly very suitable, for example, for sealing joints in structures. Often, however, rapid curing even in deeper layers is desired, for example in the case of mold-making or casting materials. In this case, two-component systems which already contain all constituents necessary for curing are required.

Usually, all constituents of a two-component system are divided into two components so that storage-stable premixes result. Thus, for example, long-chain polymers having silanol groups and optionally water are combined in one component and organosilicon compounds having hydrolyzable groups and catalysts in a second component. Apart from these four main constituents, the materials frequently contain further ingredients, for example, fillers, plasticizers and a very wide range of additives.

Known catalysts for two-component materials crosslinking at room temperature by condensation reaction are organotin compounds. A disadvantage of these catalysts is that they are not ecologically safe. Nevertheless, they are used in relatively large amounts. Moreover, these materials have a very great tendency to reversion at relatively high temperatures, owing to the presence of large amounts of catalyst. A disadvantage of two-component systems known to date is furthermore that curing takes place with a considerable undesired shrinkage of the materials because the hydrolysis products, formed in large amounts, are released to the environment. This disadvantage is further exacerbated by the fact that the crosslinking agents have to be added in a large stoichiometric excess for reliable curing of the materials. Thus, EP-B1-595 531 describes the use of particularly large amounts of catalyst in mold-making materials. Furthermore, the use of alkoxysilanes as crosslinking agents whose alkoxy radicals have a particularly high molar mass is described therein. The existing disadvantage of the considerable shrinkage is further exacerbated by the high molar mass.

SUMMARY OF THE INVENTION

The invention relates to materials crosslinkable by condensation reaction and containing at least one component (A) and a component (B), characterized in that component (A) has at least one organosilicon compound (1) containing at least one unit of the formula

in which

A may be identical or different and is an organic radical bonded via nitrogen, oxygen, sulfur or phosphorus, R are identical or different, monovalent, optionally substituted hydrocarbon radicals, $R^1$ may be identical or different and is a hydrogen atom or monovalent, optionally substituted hydrocarbon radicals, Y may be identical or different and is a hydrolyzable radical, a is 0, 1, 2 or 3, preferably 0, 1 or 2, more preferably 0 or 2, b is 0, 1, 2 or 3, preferably 0, 2 or 3, and c is 0, 1 or 2, preferably 0 or 1, with the proviso that the sum of a+b+c is $\leq 4$ and the organosilicon compound (1) has at least one unit with c differing from 0 and at least two radicals Y, and component (B) contains at least one compound (2) having OH groups and selected from the group consisting of

(21) water and

(22) organosilicon compounds containing units of the formula

in which $R^2$ may be identical or different and has a meaning stated for radical R, x is 0, 1, 2 or 3, preferably 0, 1 or 2, more preferably 2, and y is 0, 1, 2 or 3, preferably 0 or 1, with the proviso that the sum of x+y is $\leq 4$ and organosilicon compound (22) has at least two OH groups.

The organosilicon compounds (1) may be monomeric, oligomeric or polymeric compounds.

The organosilicon compounds (1) may be both silanes, i.e. compounds of the formula (I) with a+b+c=4, and siloxanes, i.e. compounds containing units of the formula (I) with a+b+c$\leq 3$.

The organosilicon compounds (1) may also be polymers having an organic basis. In the context of the present invention, polymers having an organic basis are to be understood as meaning all polymers containing at least one unit of the formula (I) in which at least 50%, preferably at least 70%, more preferably at least 90%, of all bonds in the main chain are carbon-carbon, carbon-nitrogen or carbon-oxygen bonds.

Preferably, the organosilicon compounds (1) are silanes and siloxanes, those which consist of units of the formula (I) being particularly preferred.

Most preferably, the organosilicon compounds (1) are siloxanes, in particular those which consist of from 10 to 2000 units of the formula (I).

In particular, the siloxanes (1) are substantially linear siloxanes having terminal groups of the formula (I) with c equal to 1 at each chain end. As a result of the preparation, monomeric silanes may be present in addition to the linear siloxanes.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical;

dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as the o-, m- and p-tolyl radicals, xylyl radicals, and ethylphenyl radicals; and aralkyl radicals such as the benzyl radical and the α- and the β-phenylethyl radicals.

Examples of substituted radicals R are haloalkyl radicals such as the 3,3,3-trifluoro-n-propyl radical, the 2,2,2,2',2',2'-hexafluoroisopropyl radical and the heptafluoroisopropyl radical; haloaryl radicals such as the o-, m- and p-chlorophenyl radicals; and the 2-methoxyethyl radical, the 2-methoxypropyl radical and the 2-(2-methoxyethoxy)ethyl radical.

Radicals R are preferably optionally substituted, monovalent hydrocarbon radicals having 1 to 18 carbon atoms, more preferably alkyl radicals, the vinyl, 3,3,3-trifluoroprop-1-yl, and phenyl radical radicals, in particular the methyl radical.

Examples of radicals $R^1$ are a hydrogen atom and the radicals stated for R.

Radicals $R^1$ are preferably a hydrogen atom and hydrocarbon radicals having 1 to 20 carbon atoms, in particular a hydrogen atom.

Radicals A are preferably radicals $R^3R^4N$—, $R^5O$—, $R^9S$—, $(R^{10}O)_2P(=O)$— and $O=C=N$—, in which $R^3$ and $R^4$, in each case independently of one another, are a hydrogen atom or monovalent, optionally substituted hydrocarbon radical, it also being possible for the group $R^3R^4N$— to be linked to form a ring which may also contain other elements instead of carbon atoms, $R^5$ is an optionally substituted hydrocarbon radical or a radical $CH_3(C=CH^2)$—$(C=O)$— and $CH_3$—$O$—$(C=O)$—, $R^9$ and $R^{10}$, in each case independently of one another, may be identical or different and are an optionally substituted hydrocarbon radical.

Examples of radicals $R^3$ and $R^4$ are a hydrogen atom and the examples stated above for R.

Examples of radicals $R^5$, $R^9$ and $R^{10}$ are, in each case independently of one another, the examples of hydrocarbon radicals stated above for R.

Radical $R^3$ is preferably a methyl, ethyl, propyl, butyl, hexyl, phenyl, cyclohexyl or octyl radical.

Radical $R^4$ is preferably a methyl, ethyl, propyl, butyl, hexyl or octyl radical or a hydrogen atom.

The group $R^3R^4N$— very preferably forms a ring which in particular also contains oxygen or further nitrogen.

Furthermore, the radicals $R^3$ or $R^4$ may also form a ring with $R^1$, which however is not preferred.

Radical $R^5$ is preferably the radical $CH_3(C=CH_2)$—$(C=O)$— or the radical $CH_3$—$O$—$(C=O)$—.

Radical $R^9$ is preferably a methyl, ethyl, propyl, butyl, hexyl or octyl radical.

Radical $R^{10}$ is preferably a methyl, ethyl, propyl, butyl, hexyl or octyl radical.

Examples of radicals A are the dimethylamino, diethylamino, the dibutylamino, the dihexylamino, the n-hexylamino, the octylamino, methylmercapto, the ethyl-mercapto, the ethoxy, the N-cyclohexylamino, the N-phenylamino, the methacryloyloxy, the isocyanato, the N-morpholino, the N-pyrrolidino, the N-piperidino and the O-methylcarbamato radical.

Particularly preferred radicals A are the radicals $R^3R^4N$— where $R^3$ and $R^4$ have one of the abovementioned meanings and most preferably radicals $R^3HN$— and those radicals $R^3R^4N$— in which the group $R^3R^4N$— is linked to form a ring, in particular $R^3HN$— and those radicals $R^3R^4N$— in which the group $R^3R^4N$— is linked to form a ring which also contains oxygen or further nitrogen.

Cyclic radicals A comprising $R^3R^4N$— are preferably 3-, 4-, 5-, 6-, 7- or 8-membered heterocycles which, as ring-forming atoms in addition to carbon and nitrogen, may have phosphorus and/or oxygen and/or sulfur as a heteroatom, it also being possible for further rings to be fused.

The heterocycles on which these radicals A are based are most preferably 5- and 6-membered heterocycles which contain a further ring heteroatom in addition to the nitrogen atom present for bonding to the $CR^1_2$ radical of the compounds of the formula (I).

Examples of heterocycles on which the cyclic radicals A are based are aziridine, azetidine, pyrrole, pyrrolidine, 1,3-oxazolidine, 1,3-thiazolidine, 1H-1,2-diazole, $\Delta^2$-1,2-diazoline, $\Delta^4$-1,2-diazoline, 1,3-diazole, $\Delta^2$-1,3-diazoline, $\Delta^4$-1,3-diazoline, 1,3-diazolidine, 1,2,3-triazole, 1,2,4-triazole, tetrazole, $\Delta^4$-1,2-diazolin-3-one, piperidine, tetra-hydro-1,4-oxazine, tetrahydro-1,4-thiazine, hexahydro-1,3-diazine, hexahydro-1,4-diazine, 1-methylhexahydro-1,4-diazine, hexahydro-1,3,5-triazine, hexahydro-1,3-diazin-4-one, 4-methylhexahydro-1,4-diazin-3-one, 1H-azepine, hexahydroazepine, octahydroazocine, 1H-benzo[b]pyrrole, 2,3-dihydrobenzo[b]pyrrole, 9H-di-benzopyrrole, benzo[d]-1,2-diazole, benzo[d]-1,3-diazole and benzo[d]-1,2,3-triazole.

Pyrrolidine, piperidine, tetrahydro-1,4-oxazine, tetra-hydro-1,4-thiazine, tetrahydro-1,4-diazine and 1-methyltetrahydro-1,4-diazine are particularly preferred heterocycles on which the cyclic radicals A are based, in particular tetrahydro-1,4-oxazine.

Examples of radicals Y are all hydrolyzable radicals known to date, such as, for example, halogen atoms, organyloxy radicals, Si—N bonded amine radicals, amide radicals, oxime radicals, acyloxy radicals and aminoxy radicals.

Radicals Y are preferably organyloxy radicals such as methoxy, ethoxy, n-propoxy, isopropoxy, n-butoxy, isobutoxy, sec-butoxy, tert-butoxy and 2-methoxyethoxy radicals; acyloxy radicals such as the acetoxy radical; amino radicals such as methylamino, dimethylamino, ethylamino, diethylamino and cyclohexylamino radicals; amido radicals such as the N-methylacetamido and benzamido radicals; aminoxy radicals such as the diethylaminoxy radical; oximo radicals such as the methylethylketoximo and methylisobutylketoximo radicals; and enoxy radicals such as the 2-propenoxy radical, more preferably the methoxy, ethoxy, acetoxy, methylethylketoximo, methylisobutylketoximo, dimethylamino and cyclohexylamino radicals, and in particular the methoxy or ethoxy radical.

Examples of polymeric organosilicon compound (1) are organic polymers having groups of the formula (I) with c differing from 0, such as polyisobutylene and copolymers of polyisobutylene with isoprene; polychloroprenes; polyisoprene; polyurethanes; polyesters; polyamides; polyacrylates; polymethacrylates; vinylpolymers and polycarbonates, or polyorganosiloxanes. The preparation of these polymers can be effected by known processes, such as addition reactions, for example, hydrosilylation, Michael addition, Diels-Alder addition, the addition reaction of isocyanate with reactive groups having active hydrogen such as amines, amides, hydroxyl or mercapto groups, the polycondensation of short-chain polyorganosiloxanediols and the addition reaction of epoxides with amines or the copolymerization of vinylsilanes with organic monomers having a double bond or the grafting of vinylsilanes on vinyl polymers. The methods of preparation can optionally be combined with one another.

However, copolymers comprising siloxane blocks and organic polymers can also be used as polymeric organosilicon compound (1), with the proviso that they contain at least one unit of the formula (I) with c differing from 0, as described, for example, in EP B1 1 370 602, which is incorporated by reference herein.

The polymeric organosilicon compounds (1) used according to the invention may be homopolymers as well as copolymers, which in each case may be linear or branched.

Examples of organosilicon compound (1) as siloxanes comprising units of the formula (I) are reaction products of polydiorganosiloxanediols having a viscosity of from 10 to 10,000,000 mPa·s at 25° C. and silanes of the formula (1), such as

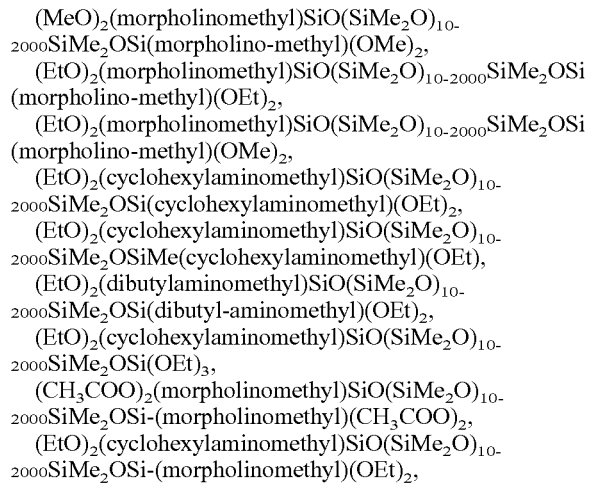

$(MeO)_2(morpholinomethyl)SiO(SiMe_2O)_{10-2000}SiMe_2OSi(morpholino-methyl)(OMe)_2$,
$(EtO)_2(morpholinomethyl)SiO(SiMe_2O)_{10-2000}SiMe_2OSi(morpholino-methyl)(OEt)_2$,
$(EtO)_2(morpholinomethyl)SiO(SiMe_2O)_{10-2000}SiMe_2OSi(morpholino-methyl)(OMe)_2$,
$(EtO)_2(cyclohexylaminomethyl)SiO(SiMe_2O)_{10-2000}SiMe_2OSi(cyclohexylaminomethyl)(OEt)_2$,
$(EtO)_2(cyclohexylaminomethyl)SiO(SiMe_2O)_{10-2000}SiMe_2OSiMe(cyclohexylaminomethyl)(OEt)$,
$(EtO)_2(dibutylaminomethyl)SiO(SiMe_2O)_{10-2000}SiMe_2OSi(dibutyl-aminomethyl)(OEt)_2$,
$(EtO)_2(cyclohexylaminomethyl)SiO(SiMe_2O)_{10-2000}SiMe_2OSi(OEt)_3$,
$(CH_3COO)_2(morpholinomethyl)SiO(SiMe_2O)_{10-2000}SiMe_2OSi-(morpholinomethyl)(CH_3COO)_2$,
$(EtO)_2(cyclohexylaminomethyl)SiO(SiMe_2O)_{10-2000}SiMe_2OSi-(morpholinomethyl)(OEt)_2$, in which Me is a methyl radical and Et is an ethyl Examples of organosilicon compound (1) as silanes of the formula (I) are compounds such as (N-cyclohexylamino-methyl) triethoxysilane, (N-cyclohexylaminomethyl)methyl-diethoxysilane, (N-phenylaminomethyl)triethoxysilane, (N-phenylaminomethyl)methyldimethoxysilane, (methacryloyl-oxymethyl) triethoxysilane, (methacryloyloxymethyl)methyl-diethoxysilane and (isocyanatomethyl)triethoxysilane and the partial hydrolysis products thereof.

Further examples of organosilicon compound (1) as silanes of the formula (I) are heterocyclic compounds, such as 1-(triethoxysilylmethyl)pyrrole, 1-(triethoxy-silylmethyl)pyrrolidine, 3-(triethoxysilylmethyl)-1,3-oxazolidine, 3-(triethoxysilylmethyl)-1,3-thiazolidine, 1-(triethoxysilylmethyl)piperidine and 4-(triethoxy-silylmethyl)tetrahydro-1,4-oxazine and the partial hydrolysis products thereof. Further examples are all abovementioned compounds in which the triethoxysilyl radical is replaced by a triacetoxysilyl radical, trimethoxysilyl radical, diethoxymethylsilyl radical or dimethoxymethylsilyl radical.

If organosilicon compounds (1) are silanes, these are preferably liquid at room temperature, have boiling points preferably above 200° C. and preferably have kinematic viscosities at 25° C. of from 0.5 to 20 mm$^2$/s.

If organosilicon compounds (1) are polymeric compounds, these are likewise preferably liquid at room temperature and have dynamic viscosities at 25° C. of, preferably, from 10 to 1,000,000 mPa·s.

Organosilicon compounds (1) are commercially available products or can be prepared by methods customary in silicon chemistry.

The constituent (21) is water, it being possible for the water to be present in component (B) directly as such, in the form of aqueous preparations or as water present in solids. Furthermore, the water may also be produced in situ.

Examples of aqueous preparations which may be present as constituent (21) in component (B) according to the invention are aqueous emulsions, such as, for example, silicone oil/water emulsions or emulsions of water in silicone oil, the silicone oil preferably being polydiorganosiloxanes terminated with methyl groups.

Examples of water present in solids are moisture bound to fillers, for example, finely divided fillers such as hydrophilic silicas or ground calcium carbonates, which may contain up to more than 1% by weight of water bound to the surface.

Further examples of water present in solids are fillers, such as precipitated calcium carbonates, which contain physically bound water in the interior of the filler particles, or water particles enclosed by waxy or resin-like polymers.

Further examples of water present in solids are solids which contain chemically bound water, such as water of crystallization.

However, the water (21) present in solids often requires thermal processes to accelerate the liberation of the water. Overall, the crosslinking takes place relatively slowly because, in addition to the liberation of the water, it is also associated with the diffusion of the water inside the material. This embodiment is therefore preferably used when the crosslinkable material is present in thin layers.

If the materials according to the invention are those in which component (B) contains fillers, preferably no additional water is used but only that which adheres directly to fillers and can be separated from the fillers only with considerable effort.

Constituent (21) is preferably water in the form of emulsions or water present in solids, water present in solids being particularly preferred.

Examples and preferred and particularly preferred ranges for radical R$^2$ are the examples stated for R.

The optional organosilicon compounds (22) may be both silanes, i.e. compounds of the formula (II) where x+y=4, and siloxanes, i.e. compounds containing units of the formula (II) where x+y≦3. The optional organosilicon compounds (22) are preferably organopolysiloxanes, in particular those which consist of units of the formula (II).

The optional organosilicon compounds (22) are most preferably substantially linear, OH-terminated organopolysiloxanes, in particular α,ω-dihydroxydiorganopolysiloxanes.

Examples of organosilicon compounds (22) are
$(HO)Me_2SiO[SiMe_2O]_{5-2000}SiMe_2(OH)$,
$(HO)Me_2SiO[SiMe_2O]_{5-2000}[SiMeViO]_{1-100}SiMe_2(OH)$ and
$(HO)Me_2SiO[SiMe_2O]_{5-2000}[SiMePhO]_{1-100}SiMe_2(OH)$,
in which Me is the methyl radical, Vi is the vinyl radical and Ph is the phenyl radical.

The optional organosilicon compounds (22) preferably have a viscosity of from 10 to 10$^6$ mPa·s, more preferably from 10$^3$ to 350,000 mPa·s, in each case at 25° C.

The organosilicon compounds (22) are commercially available products or can be prepared by methods customary in silicon chemistry.

Constituent (2) is preferably organosilicon compound (22).

If organosilicon compound (22) is used in the materials according to the invention, the stoichiometric ratio of hydrolyzable groups Y of the organosilicon compound (1) to the sum of the silanol groups of the organosilicon compound (22) is preferably from 0.05 to 30, more preferably from 0.1 to 20, and in particular from 0.2 to 10.

If water (21) is used in the materials according to the invention, the ratio of the stoichiometric amount of the hydrolyzable groups Y of the organosilicon compound (1) to the stoichiometric amount of water (21) is preferably from 0.05 to 5, more preferably from 0.25 to 2.5, and in particular from 0.5 to 1.5.

In addition to the constituents (1) and (2) described above, the materials according to the invention may now contain all substances which have also been used to date in materials crosslinkable by condensation reaction, such as, for example, catalysts (3), further crosslinking agents (4), compound (5) having basic nitrogen, fillers (6), adhesion promoters (7), plasticizers (8) and additives (9), constituents (4), (5) and (7) differing from constituent (1).

Examples of catalysts (3) are the titanium compounds already known to date, such as tetraisopropoxy titanate, zinc compounds such as zinc 2-ethylhexanoate, and organic tin compounds such as di-n-butyltin dilaurate and di-n-butyltin diacetate, di-n-butyltin oxide, dioctyltin diacetate, dioctyltin dilaurate, dioctyltin oxide, and reaction products of these compounds with alkoxysilanes such as tetraethoxysilane, where di-n-octyltin diacetate and dioctyltin oxide are preferred in tetraethyl silicate hydrolysis products and di-n-octyltin oxide is particularly preferred in tetraethyl silicate hydrolysis product.

If catalysts (3) are used in the materials according to the invention, the amounts thereof are preferably from 0.0001 to 5.0% by weight, more preferably from 0.0001 to 1.0% by weight, based in each case on the crosslinkable material.

If organotin compounds are used as catalysts (3), the amounts thereof are preferably from 0.0001 to 0.1% by weight, more preferably from 0.0001 to 0.05% by weight, based in each case on the crosslinkable material according to the invention. Preferably, the materials according to the invention contain no organotin catalyst (3).

The further crosslinking agents (4) optionally used in the materials according to the invention may be any desired crosslinking agents known to date and having at least three hydrolyzable radicals, such as silanes having at least three organyloxy groups, which are different from constituent (1).

The optional further crosslinking agents (4) are more preferably silane crosslinking agents such as tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 3-cyanopropyltrimethoxysilane, 3-cyanopropyltriethoxysilane, 3-(glycidyloxy)propyltriethoxysilane, 1,2-bis(trimethoxysilyl)ethane, 1,2-bis(triethoxysilyl)ethane, cyclohexylaminomethyltriethoxysilane, methyltriacetoxysilane, ethyltriacetoxysilane, methyltris(methylethylketoximo)silane and vinyltris(methylethylketoximo)silane and the partial hydrolysis products thereof.

The optional further crosslinking agents (4) are commercially available products or can be prepared by processes known in silicon chemistry.

If the materials contain further crosslinking agents (4), the amounts thereof are preferably from 0.01 to 10 parts by weight, more preferably from 0.1 to 5 parts by weight, and most preferably from 0.2 to 3 parts by weight, based in each case on 100 parts by weight of the material. Preferably, the materials contain additional crosslinking agents (4).

The optional compounds (5) having basic nitrogen are preferably those selected from the group consisting of compounds of the formula $$NR^6_3 \qquad (III),$$

in which $R^6$ may be identical or different and is the hydrogen atom or hydrocarbon radicals which are optionally substituted by hydroxyl groups, halogen atoms, amino groups, ether groups, ester groups, epoxy groups, mercapto groups, cyano groups or (poly)glycol radicals, the latter being composed of oxyethylene and/or oxypropylene units, with the proviso that, in formula (III), at most two $R^6$ have the meaning of the hydrogen atom and, if two $R^6$ are present, these may also be linked to one another to form cyclic structures, and organosilicon compounds with at least one organic radical having basic nitrogen, which differ from constituent (1), comprising units of the formula

in which $R^7$ may be identical or different and is a monovalent, SiC-bonded organic radical free of basic nitrogen, $R^8$ may be identical or different and has a meaning stated for radical $R^2$, X may be identical or different and is a monovalent, SiC-bonded radical having basic nitrogen, k is 0, 1, 2 or 3, l is 0, 1, 2, 3 or 4 and m is 0, 1, 2 or 3, with the proviso that the sum of k+l+m is less than or equal to 4 and at least one radical X is present per molecule.

Examples of radicals $R^6$ and $R^7$ are, in each case independently of one another, the examples stated for R, for optionally substituted hydrocarbon radicals.

The optionally substituted hydrocarbon radicals $R^6$ are preferably those having 1 to 18 carbon atoms.

Radicals $R^7$ are preferably hydrocarbon radicals having 1 to 18 carbon atoms, the methyl, ethyl and n-propyl radical being particularly preferred, in particular the methyl radical.

Examples of radical $R^8$ are the examples stated for radical $R^2$.

Preferably, radical $R^8$ is the methyl or ethyl radical.

Examples of radicals X are radicals of the formulae $H_2NCH_2—$, $H_2N(CH_2)_2—$, $H_2N(CH_2)_3—$, $H_2N(CH_2)_2NH(CH_2)_2—$, $H_2N(CH_2)_2NH(CH_2)_3—$, $H_2N(CH_2)_2NH(CH_2)_2NH(CH_2)_3—$, $H_3CNH(CH_2)_3—$, $C_2H_5NH(CH_2)_3—$, $H_3CNH(CH_2)_2—$, $C_2H_5NH(CH_2)_2—$, $H_2N(CH_2)_4—$, $H_2N(CH_2)_5—$, $H(NHCH_2CH_2)_3—$, $C_4H_9NH(CH_2)_2NH(CH_2)_2—$, cyclo-$C_6H_{11}NH(CH_2)_3—$, cyclo-$C_6H_{11}NH(CH_2)_2—$, $(CH_3)_2N(CH_2)_3—$, $(CH_3)_2N(CH_2)_2—$, $(C_2H_5)_2N(CH_2)_3—$ and $(C_2H_5)_2N(CH_2)_2—$.

X is preferably $H_2N(CH_2)_3—$, $H_2N(CH_2)_2NH(CH_2)_3—$, $H_3CNH(CH_2)_3—$, $C_2H_5NH(CH_2)_3—$ and cyclo-$C_6H_{11}NH(CH_2)_3—$ radical, the $H_2N(CH_2)_2NH(CH_2)_3—$ and cyclo-$C_6H_{11}NH(CH_2)_3—$ radicals being particularly preferred.

If the organosilicon compounds comprising units of the formula (IV) are silanes, k is preferably 0, 1 or 2, more preferably 0 or 1, 1 is preferably 1 or 2, more preferably 1, and m is preferably 1, 2 or 3, more preferably 2 or 3, with the proviso that the sum of k+l+m is equal to 4.

Examples of the optional silanes of the formula (IV) which are are $H_2N(CH_2)_3—Si(OCH_3)_3$, $H_2N(CH_2)_3—Si(OC_2H_5)_3$, $H_2N(CH_2)_3—Si(OCH_3)_2CH_3$, $H_2N(CH_2)_3—Si(OC_2H_5)_2CH_3$, $H_2N(CH_2)_2NH(CH_2)_3—Si(OCH_3)_3$, $H_2N(CH_2)_2NH(CH_2)_3—Si(OC_2H_5)_3$, cyclo-$C_6H_{11}NH(CH_2)_3Si(OCH_3)_3$, cyclo-$C_6H_{11}NH(CH_2)_3—Si(OC_2H_5)_3$ and the partial hydrolysis products thereof, $H_2N(CH_2)_3—Si(OC_2H_5)_3$, $H_2N(CH_2)_2NH(CH_2)_3—Si(OCH_3)_3$, $H_2N(CH_2)_2NH(CH_2)_3—Si(OC_2H_5)_3$, $H_2N(CH_2)_2NH(CH_2)_3—Si(OCH_3)_2CH_3$, $H_2N(CH_2)_2NH(CH_2)_3—Si(OC_2H_5)_2CH_3$, $H_2N(CH_2)_2NH(CH_2)_3—Si(OH)_2CH_3$, cyclo-$C_6H_{11}NH(CH_2)_3—Si(OCH_3)_3$ and cyclo-$C_6H_{11}NH(CH_2)_3—Si(OC_2H_5)_3$ being preferred, and $H_2N(CH_2)_3—Si(OC_2H_5)_3$, $H_2N(CH_2)_2NH(CH_2)_3—Si(OCH_3)_3$ and cyclo-$C_6H_{11}NH(CH_2)_3—Si(OCH_3)_3$ and the partial hydrolysis products thereof in each case being most preferred.

If the organosilicon compound comprising units of the formula (IV) are organopolysiloxanes, the average value of k is preferably from 0.5 to 2.5, more preferably from 1.4 to 2.0, the average value of l is preferably from 0.01 to 1.0, more preferably from 0.01 to 0.6, and the average value of m is preferably from 0 to 2.0, more preferably from 0 to 0.2, with the proviso that the sum of k, l and m is less than or equal to 3.

The organopolysiloxanes usable according to the invention and comprising units of the formula (IV) preferably have a viscosity at 25° C. of from 5 to $10^5$ mPa·s, more preferably from 10 to $10^4$ mPa·s.

Examples of the organopolysiloxanes usable according to the invention and comprising units of the formula (IV) are $H_2N(CH_2)_3$—$Si(OC_2H_5)_2$—O—$Si(CH_3)$ $(OC_2H_5)_2$,
$H_2N(CH_2)_3$—$Si(OC_2H_5)(CH_3)$—O—$Si(OCH_3)_3$,
$H_2N(CH_2)_2NH(CH_2)_3$—$Si(OC_2H_5)_2$—O—$Si(CH_3)$ $(OC_2H_5)_2$,
$H_2N(CH_2)_2NH(CH_2)_3$—$Si(OCH_3)$ $(CH_3)$—O—$Si(OCH_3)_3$,
$H_2N(CH_2)_2NH(CH_2)_3$—$Si(OC_2H_5)$ $(CH_3)$—O—$Si(OCH_3)_3$,
cyclo-$C_6H_{11}NH(CH_2)_3$—$Si(OC_2H_5)_2$—O—$Si(CH_3)$ $(OC_2H_5)_2$,
cyclo-$C_6H_{11}NH(CH_2)_3$—$Si(OC_2H_5)$ $(CH_3)$—O—$Si(OCH_3)_3$,
$H_2N(CH_2)_3$—$Si(OCH_3)_2$—(O—$Si(CH_3)_2)_{1-100}$—O—$Si(OCH_3)_2$—$(CH_2)_3NH_2$,
$H_2N(CH_2)_2NH(CH_2)_3$—$Si(OCH_3)_2$—(O—$Si(CH_3)_2)_{1-100}$—O—$Si(OCH_3)_2$—$(CH_2)_3NH(CH_2)_2NH_2$ and
cyclo-$C_6H_{11}NH(CH_2)_3$—$Si(OCH_3)_2$—(O—$Si(CH_3)_2)_{1-100}$—O—$Si(OCH_3)_2$—$(CH_2)_3NH$—,
cyclo-$C_6H_{11}$ and the partial hydrolysis products thereof, $H_2N(CH_2)_3$—$Si(OC_2H_5)_2$—O—$Si(CH_3)$ $(OC_2H_5)_2$ being preferred.

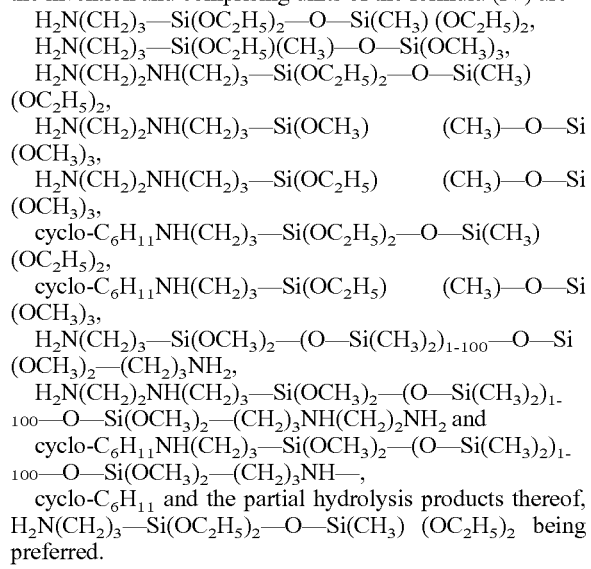

Organosilicon compounds comprising units of the formula (IV) are commercially available products and can be prepared by processes customary in silicon chemistry.

Examples of amines of the formula (III) are cyclohexylamine, triethylamine, trioctylamine, butylamine, dodecylamine, diethyl-n-propylamine, cyclohexylmethyl-amine, 2-aminoethanol, 2-amino-n-propanol, 2-amino-2-methyl-1-propanol, 2-dimethylamino-2-methyl-1-propanol, N,N-diethylethanolamine, ethylenediamine, coconut fatty amine, coconut fatty methylamine, N,N-dimethyl-ethanolamine and aniline.

If compounds (5) having basic nitrogen are used, these are preferably organosilicon compounds comprising units of the formula (IV).

If the materials according to the invention contain component (5), the amounts thereof are preferably from 0.01 to 5 parts by weight, more preferably from 0.05 to 2 parts by weight, based in each case on 100 parts by weight of the material according to the invention. Preferably, the materials according to the invention contain component (5).

Examples of fillers (6) are non-reinforcing fillers, i.e. fillers having a BET surface area of up to 50 m²/g, such as quartz, diatomaceous earth, calcium silicate, zirconium silicate, zeolites, metal oxide powders, such as aluminum, titanium, iron or zinc oxides or mixed oxides thereof, barium sulfate, calcium carbonate, gypsum, silicon nitride, silicon carbide, boron nitride, glass powder and plastics powder, such as polyacrylonitrile powder; reinforcing fillers, i.e. fillers having a BET surface area of more than 50 m²/g, such as pyrogenically prepared silica, precipitated silica, precipitated chalk, carbon black, such as furnace black and acetylene black, and mixed silicon-aluminum oxides having a large BET surface area; fibrous fillers, such as asbestos and plastics fibers. Said fillers may have been rendered water repellent, for example by treatment with organosilanes or organosiloxanes or with stearic acid or by etherification of hydroxyl groups to give alkoxy groups. If fillers (6) are used, these are preferably hydrophobic pyrogenic silica and precipitated or ground calcium carbonate.

If the materials according to the invention contain fillers (6), the amounts thereof are preferably from 1 to 70 parts by weight, preferably from 5 to 50 parts by weight, based in each case on 100 parts by weight of the material according to the invention. Preferably, the materials according to the invention contain fillers (6).

Examples of the optional adhesion promoters (7) are silanes and organopolysiloxanes having functional groups such as glycidyloxypropyl, aminopropyl, aminoethylaminopropyl, ureidopropyl or methacryloyloxypropyl radicals. If, however, another component, such as, for example, organosilicon compound (1), (2), (4) or (6), already has said functional groups, an addition of adhesion promoter (7) can be dispensed with.

If the materials according to the invention contain adhesion promoter (7), the amounts thereof are preferably from 0.01 to 3 parts by weight, more preferably from 0.1 to 0.5 part by weight, based in each case on 100 parts by weight of the material. Preferably, the materials contain no adhesion promoters (7).

Examples of plasticizers (8) are dimethylpolysiloxanes which are liquid at room temperature and endcapped by trimethylsilyloxy groups, in particular having viscosities at 25° C. in the range from 50 to 1000 mPa·s, and high-boiling hydrocarbons such as liquid paraffins, dialkylbenzenes, dialkylnapthalenes or mineral oils consisting of naphthenic and paraffinic units, polyglycols, in particular polypropylene glycols, which may optionally be substituted, high-boiling esters such as, phthalates, citric acid esters or diesters of dicarboxylic acids, liquid polyesters or methacrylates and alkylsulfonic acid esters.

If the materials contain plasticizers (8), the amounts are preferably from 0.1 to 70 parts by weight, more preferably from 1 to 50 parts by weight, based in each case on 100 parts by weight of the material. Preferably, the materials contain plasticizers (8).

Examples of additives (9) are agents for influencing the crosslinking rate such as organic or inorganic acids, pigments, dyes, fragrances, antioxidants, agents for influencing the electrical properties such as conductive carbon black, agents imparting flame retardance, light stabilizers, and agents for prolonging the skin formation time such as silanes having an SiC-bonded mercaptoalkyl radical, cell-producing agents, e.g. azodicarbonamide, heat stabilizers and thixotropic agents such as polyethers, and organic solvents such as alkylaromatics, such as phosphoric acid esters and phosphonic acids, biocides, such as fungicides, bactericides, acaricides, and modulus regulators such as polydimethylsiloxanes having a terminal OH group.

If the materials contain additives (9), the amounts thereof are preferably from 0.0001 to 20 parts by weight, more preferably from 0.01 to 10 parts by weight and most preferably from 0.1 to 3 parts by weight, based in each case on 100 parts by weight of the material. Preferably, the materials contain additives (9).

Preferably, the materials according to the invention contain no constituents over and above the constituents (1) to (9).

The individual constituents of the materials according to the invention may in each case be one type of such a constituent as well as a mixture of at least two different types of such constituents.

The optionally used constituents (3), (4), (5), (6), (7), (8) and (9) may now be present in component (A), in component (B) or in both. One or more constituents (3) to (9) can, however, also form one or more further components. If one of the optionally used constituents (3) to (9) contains water and/or OH groups, this is preferably used in component (B).

If, in the case of the materials according to the invention, component (A) is to contain fillers (6), the water possibly present in the filler is preferably removed. This can be effected, for example, by correspondingly increasing the amount of constituent (1), the hydrolyzable groups Y in constituent (1) reacting with the water so that a storage-stable component (A) is obtained. Constituent (1) acts as a so-called scavenger.

The materials according to the invention may now contain two or more components. For example, 3-component systems are preferred if catalysts (3) or additives (9) do not form storage-stable components either with organosilicon compound (21) or with organo-silicon compound (1).

The materials according to the invention preferably consist of two components (A) and (B).

The materials according to the invention are preferably those (material 1) containing component (A) consisting of
monomeric or oligomeric organosilicon compounds (1), optionally catalyst (3) and optionally further crosslinking agent (4)
and
component (B) consisting of
organosilicon compound (22), optionally water (21), optionally compound (5) having basic nitrogen, fillers (6), plasticizers (8) and additives (9), material 1 most preferably containing no further components.

Furthermore, the materials according to the invention are preferably those (material 2) containing component (A) consisting of
substantially linear siloxanes (1) having in each case a terminal group $[A-CR^1{}_2]$ at each chain end, optionally catalyst (3), optionally further crosslinking agents (4), optionally compound (5) having basic nitrogen, fillers (6), plasticizers (8) and additives (9), and component (B) consisting of
organosilicon compound (22) and/or water (21), material 2 particularly most preferably containing no further components.

The materials according to the invention are preferably those (material 3) containing component (A) consisting of
substantially linear siloxanes (1) having in each case a terminal group $[A-CR^1{}_2]$ at each chain end, optionally catalyst (3), optionally further crosslinking agents (4), optionally compound (5) having basic nitrogen, fillers (6), plasticizers (8) and additives (9), and component (B) consisting of
organosilicon compound (22) and/or water (21), optionally compound (5) having basic nitrogen, fillers (6), plasticizers (8) and additives (9), material 3 particularly most preferably containing no further components.

The mixing ratios of the individual components may vary within wide ranges and are known to the person skilled in the art. The mixing ratios of the two components (A) to (B) of the materials according to the invention are preferably from 0.2:100 to 100:0.2, it being possible for these mixing ratios to be based on weight as well as volume.

Most preferably, the materials according to the invention are those of the type "material 3". On this basis, the person skilled in the art can very easily provide materials which have a mixing ratio of the two components (A) to (B) of from 1:2 to 2:1, which has proven useful in practice. The mixing ratio may be based both on the weight and on the volume of the components; preferably, however, it is based on volume, since many automated metering systems meter in a volume-based manner in industry for reasons of simplicity. The most important advantage of mixing ratios in the region of 1:1 is, however, that narrow metering limits are substantially easier to comply with.

The materials according to the invention of the type "material 1" have mixing ratios of the two components (A) to (B) of preferably from 1:10 to 1:500. In the case of these mixing ratios, which may be based on weight as well as on volume, small variations in the metered amounts of the component (A) can have dramatic effects on the crosslinking rate and the elastomeric properties of the cured material. They are therefore not particularly preferred.

The materials according to the invention of the type "material 2" have as a rule a mixing ratio (A) to (B) of about 2:1 to 10:1. Owing to the large proportion of hydrolysis-sensitive component (A), they are not particularly preferred.

With respect to the metering technique, however, which component has the greater proportion, based on the total amount of material, is completely unimportant in practice.

The materials according to the invention are most preferably those which are free of organotin compounds.

For the provision of the individual components of the materials according to the invention, the constituents present in each case therein can be mixed with one another in any desired sequence. This mixing can be effected at room temperature and ambient pressure, i.e. from about 900 to 1100 hPa, or under reduced pressure of about 20 hPa to 800 hPa. If desired, this mixing can, however, also be effected at higher temperatures, for example at temperatures in the range from 35 to 135° C. If desired, heating or cooling may be effected.

The mixing, according to the invention, of component (A) preferably takes place with very substantial exclusion of water from the surrounding atmosphere, for example by blanketing with dry air.

Since very often air enters the premix during the preparation of the individual components in the open atmosphere, this can advantageously be removed by a degassing step in order to avoid bubbles in the cured material.

The individual components of the material according to the invention are storage-stable premixes which can then be mixed on site.

The crosslinking of the materials according to the invention takes place when the components (A) and (B) are brought into contact, preferably at room temperature, mechanical mixing being preferred. It can, if desired, also take place at higher or lower temperatures than room temperature, e.g. at from −5° C. to 15° C. or at 30° C. to 50° C.

Preferably, the crosslinking is carried out at a pressure of from 100 to 1100 hPa, in particular at ambient pressure.

Depending on the viscosity of the prepared mixture of the components, the material can be further processed, for example, by spraying, pouring or spreading. The viscosities may range from very low viscosity, if, for example, the coating of substrates is desired, to very high viscosity, if, for example, overhead molding is desired.

The present invention furthermore relates to moldings produced by crosslinking the materials according to the invention.

The materials according to the invention can be employed for all intended uses for which materials crosslinking at room temperature to give elastomers can be used.

The materials according to the invention are therefore excellently suitable, for example, for moldings, coatings, adhesive bonds, seals, castings or for the production of shaped articles.

An advantage of the materials according to the invention is that the crosslinking takes place very rapidly.

The materials according to the invention have the advantage that the materials have a very low shrinkage on crosslinking.

A further advantage of the materials according to the invention is that they achieve their end properties very rapidly with long processing times.

An advantage of the materials according to the invention is that they are stable to reversion at relatively high temperatures.

The materials according to the invention have the advantage that no ecologically unsafe organotin compounds or only very small amounts thereof are present.

An advantage of the materials according to the invention is that mixing ratios of the individual components which facilitate automated processing can be realized in a simple manner.

An advantage of the materials according to the invention is furthermore that mixing ratios of the two components (A) and (B) in the region of 1:1 are permitted, with the result that very accurate compliance with the mixing ratio can be ensured.

In the examples described below, all viscosity data are based on a temperature of 25° C. Unless stated otherwise, the examples below are carried out at ambient pressure, i.e. at about 1000 hPa, and at room temperature, i.e. at about 23° C., or at a temperature which results on combination of the reactants at room temperature without additional heating or cooling, and at a relative humidity of about 50%. Furthermore, all data relating to parts and percentages are based on weight, unless stated otherwise.

The Shore A hardness is determined according to DIN (German industrial standard) 53505-87.

The tensile strength is determined according to DIN 53504-85 S2.

The elongation at break is determined according to DIN 53504-85 S2.

Below, the assessment of the prepared alkoxy-terminated polydimethylsiloxanes with respect to the very substantial absence of silanol groups (Si—OH content less than 30 ppm by weight) was carried out on the basis of the so-called accelerated titanate test:

10 g of prepared polymer (e.g. that which had contained 420 ppm by weight of Si-bonded OH groups before the reaction at a viscosity of 80,000 mPa·s) and isopropyl titanate (about 0.1 g) were stirred with a spatula for 3 minutes. If a sample drawn upward ran downward in a thin filament, the sample was very substantially silanol-free. If the sample drawn upward tore, it still contained more than 30 ppm by weight of Si-bonded OH groups.

The advantage of this test is in particular that it can be carried out very rapidly.

The pot life of a material was the time for which the mixture was no longer free-flowing but already had elastic fractions when stirred briefly and when the spatula was pulled out.

The times of freedom from tack were determined by touching the material surface with a finger. This means that tack was no longer present after this time.

EXAMPLE 1

50 g of an α,ω-dihydroxypolydimethylsiloxane (B) having a viscosity of 80,000 mPa·s were mixed with 0.25 g of cyclohexylaminomethyltriethoxysilane (A) using a laboratory spatula in a PE beaker.

The pot life was about 0.3 minute.

EXAMPLE 2

50 g of an α,ω-dihydroxypolydimethylsiloxane having a viscosity of 80,000 mPa·s (B) were mixed with 0.25 g of 4-(triethoxysilylmethyl)tetrahydro-1,4-oxazine (A) using a laboratory spatula in a PE beaker.

The pot life was about 11 minutes.

EXAMPLE 3

50 g of an α,ω-dihydroxypolydimethylsiloxane having a viscosity of 6000 mPa·s (B) were mixed with 0.5 g of 4-(triethoxysilylmethyl)tetrahydro-1,4-oxazine (A) using a laboratory spatula in a PE beaker.

The pot life was about 18 minutes.

After 3 hours, the material was nontacky even in deep layers.

EXAMPLE 4

An (A) component was prepared in a laboratory dissolver mixer by mixing first 100 g of an α,ω-dihydroxypolydimethylsiloxane having a viscosity of 20 mPa·s and 70 g of 4-(triethoxysilylmethyl)tetrahydro-1,4-oxazine. After 20 minutes, the titanate test was carried out, which showed that less than 30 ppm of silanol were present in the mixture. 30 g of tetraethoxysilane were then incorporated into the mixture. Finally, degassing was effected for 5 minutes at a pressure of about 200 hPa.

1 part by weight of the component (A) thus prepared was thoroughly mixed for 1 minute with 10 parts by weight of a component (B) with the aid of a laboratory spatula, where the (B) component was an α,ω-dihydroxy-polydimethylsiloxane having a viscosity of 6000 mPa·s.

The pot life was about 60 minutes.

The material was nontacky after 4 hours.

EXAMPLE 5

An (A) component was prepared in a laboratory dissolver mixer by mixing 480 g of methyl-terminated polydimethylsiloxane having a viscosity of 1000 mPa·s, 10 g of tetraethoxysilane and 10 g of 4-(triethoxy-silylmethyl)tetrahydro-1,4-oxazine.

Furthermore, a (B) component was prepared in a laboratory dissolver mixer by mixing 300 g of an α,ω-dihydroxypolydimethylsiloxane having a viscosity of 6000 mPa·s, 100 g of a methyl-terminated polydimethyl-siloxane having a viscosity of 1000 mPa·s and 100 g of a silica rendered water repellent with hexamethyldisilazane and having a BET surface area of about 200 m$^2$/g and a water content of about 0.2% (commercially available under the name HDK® H 2000 from Wacker Chemie AG, D-Munich). After a mixing time of 20 minutes, degassing was effected for a further 5 minutes at 200 hPa.

100 g of the component (B) were then thoroughly mixed for 1 minute with 4.5 g of the component (A) with the aid of a laboratory spatula.

The pot life of the material was about 30 minutes.

The material was nontacky after 8 hours.

A further 100 g of the component (B) were then thoroughly mixed for 1 minute with 4.5 g of the component (A) with the aid of a laboratory spatula and degassed in a desiccator for about 0.5 minute. This material was introduced into round PTFE molds having a diameter of 10.0 cm, the projecting part being removed with a smooth scraper.

After curing and removal from the mold, a diameter of 9.9 cm was determined 2 days later on the 2 mm thick, nontacky hides, i.e. the linear shrinkage was 1.0%.

EXAMPLE 6

An (A) component was prepared in a laboratory dissolver mixer by mixing 480 g of methyl-terminated polydimethylsiloxane having a viscosity of 1000 mPa·s, 10 g of tetraethoxysilane, 0.5 g of lauric acid and 10 g of 4-(triethoxysilylmethyl)tetrahydro-1,4-oxazine.

Furthermore, a (B) component was prepared in a laboratory dissolver mixer by firstly mixing 300 g of an α,ω-dihydroxypolydimethylsiloxane having a viscosity of 6000 mPa·s, 100 g of a methyl-terminated polydimethylsiloxane having a viscosity of 1000 mPa·s and 100 g of a silica rendered water repellent with hexamethyldisilazane and having a BET surface area of about 200 m²/g and a water content of about 0.2% (commercially available under the name HDK® H 2000 from Wacker Chemie AG, D-Munich). After a mixing time of 20 minutes, degassing was effected for a further 5 minutes at 200 hPa.

100 g of the component (B) were then thoroughly mixed for 1 minute with 4.5 g of the component (A) with the aid of a laboratory spatula.

The pot life of the material was about 40 minutes.
The material was nontacky after 10 hours.

EXAMPLE 7

An (A) component was prepared in a laboratory dissolver mixer by mixing 480 g of methyl-terminated polydimethylsiloxane having a viscosity of 1000 mPa·s, 10 g of tetraethoxysilane and 10 g of 4-(triethoxy-silylmethyl)tetrahydro-1,4-oxazine.

Furthermore, a (B) component was prepared in a laboratory dissolver mixer by mixing 300 g of an α,ω-dihydroxypolydimethylsiloxane having a viscosity of 6000 mPa·s, 100 g of a methyl-terminated polydimethyl-siloxane having a viscosity of 1000 mPa·s, 1.5 g of dibutylamine and 100 g of a silica rendered water repellent with hexamethyldisilazane and having a BET surface area of about 200 m²/g and a water content of about 0.4% (commercially available under the name HDK® V 15 from Wacker Chemie AG, D-Munich). After a mixing time of 20 minutes, degassing was effected for a further 5 minutes at 200 hPa.

100 g of the component (B) were then thoroughly mixed for 1 minute with 4.5 g of the component (A) with the aid of a laboratory spatula.

The pot life of the material was about 20 minutes.
The material was nontacky after 6 hours even in deep layers.

EXAMPLE 8

2000 g of an α,ω-dihydroxypolydimethylsiloxane having a viscosity of 80 000 mPa·s, 750 g of a methyl-terminated polydimethylsiloxane having a viscosity of 1000 mPa·s, 58 g of tetraethoxysilane, 15 g of dibutylamine, 51 g of 4-(triethoxysilylmethyl)tetrahydro-1,4-oxazine were thoroughly mixed with one another for 20 minutes in a laboratory dissolver. No silanol was detectable thereafter by the titanate test. 275 g of hydrophilic pyrogenic silica having a BET surface area of 150 m²/g and a water content of about 0.4% (commercially available under the name HDK® V 15 from Wacker Chemie AG, D-Munich) and 1.1 g of a tin catalyst which was prepared by reacting di-n-butyltin diacetate and tetra-ethoxysilane were then added. Mixing was then effected for a further 15 minutes. For degassing the mixture, a reduced pressure of about 200 hPa was applied and mixing was effected again for 5 minutes. The prepared mixture was then introduced into commercially available polyethylene cartridges.

100 g of the (A) component thus obtained were mixed with 100 g of the (B) component described in example 5 for about 1 minute in vacuo in a laboratory dissolver. Thereafter, the material was introduced into PTFE molds and left to cure.

After 24 hours, the following values were determined on the 2 mm thick, nontacky skins: hardness 26 Shore A, elongation at break 460% and tensile strength 2.0 MPa.

The invention claimed is:

1. A multicomponent RTV composition crosslinkable by condensation reaction comprising at least one component (A) and a component (B), components (A) and (B) separated from each other prior to use, wherein component (A) has at least one organosilicon compound (1) containing at least one unit of the formula $$[A-CR^1{}_2]_c SiR_a Y_b O_{(4-a-b-c)/2} \quad (I)$$

in which

A are identical or different organic radicals bonded via nitrogen, oxygen, sulfur or phosphorus, R are identical or different, monovalent, optionally substituted hydrocarbon radicals, $R^1$ are identical or different and are a hydrogen atom or monovalent, optionally substituted hydrocarbon radical, Y are identical or different and are hydrolyzable radicals, a is 0, 1, 2 or 3, b is 0, 1, 2 or 3, and c is 0, 1 or 2, with the proviso that the sum of a+b+c is ≦4 and the organosilicon compound (1) has at least one unit with c differing from 0 and at least two radicals Y, and component (B) contains at least one compound (2) having OH groups, selected from the group consisting of

(21) water and

(22) organosilicon compounds containing units of the formula $$R^2{}_x(OH)_y SiO_{(4-x-y)/2} \quad (II),$$

in which $R^2$ are identical or different and has a meaning stated for radical R, x is 0, 1, 2 or 3, and y is 0, 1, 2 or 3, with the proviso that the sum of x+y is ≦4 and organosilicon compound (22) has at least two OH groups, and with the proviso that sufficient component (B) is present to cure a mixture of (A) and (B) to a solid elastomer.

2. The composition of claim 1, wherein the organosilicon compounds (1) are siloxanes.

3. The composition of claim 1, wherein radicals A are radicals $R^3R^4N-$, $R^5O-$, $R^9S-$, $(R^{10}O)_2P(O)-$ or $O=C=N-$, in which $R^3$ and $R^4$, independently of one another, are a hydrogen atom or monovalent, optionally substituted hydrocarbon radicals, the group $R^3R^4N-$ optionally in the form of a ring which may also contain other elements instead of carbon atoms, $R^5$ is an optionally substituted hydrocarbon radical or a radical $CH_3(C=CH_2)-(C=O)-$ or $CH_3-O-(C=O)-$, $R^9$ and $R^{10}$, in each case independently of one another, are identical or different and are an optionally substituted hydrocarbon radical.

4. The composition of claim 1, wherein radicals A are radicals $R^3R^4N-$, in which $R^3$ and $R^4$, independently of one another, are a hydrogen atom or monovalent, optionally substituted hydrocarbon radical.

5. The composition of claim 1, wherein organosilicon compounds (22) are organopolysiloxanes.

6. The composition of claim 1, wherein compound (2) is organosilicon compound (22).

7. The composition of claim 1, comprising:
a component (A) comprising:
substantially linear siloxanes (1) having a terminal group $[A-CR^1{}_2]$ at each chain end, optionally catalyst (3), optionally further crosslinking agents (4), optionally compound (5) having basic nitrogen, fillers (6), plasticizers (8) and additives (9), and
a component (B) comprising:
organosilicon compound (22) and/or water (21), optionally compound (5) having basic nitrogen, fillers (6), plasticizers (8) and additives (9).

8. The composition of claim 7, consisting of:
a component (A) consisting of:
substantially linear siloxanes (1) having a terminal group $[A-CR^1{}_2]$ at each chain end, optionally catalyst (3), optionally further crosslinking agents (4), optionally compound (5) having basic nitrogen, fillers (6), plasticizers (8) and additives (9), and
a component (B) consisting of:
organosilicon compound (22) and/or water (21), optionally compound (5) having basic nitrogen, fillers (6), plasticizers (8) and additives (9).

9. The composition of claim 1, wherein the mixing ratio of components (A) and (B) is from 0.2:100 to 100:0.2 based on weight or volume.

10. A process for the preparation of the composition of claim 1, wherein for the preparation of the individual components, the respective constituents present are mixed with one another.

11. A molding produced by mixing together and crosslinking a composition of claim 1.

12. The composition of claim 1, wherein radicals A are radicals $R^3R^4N-$, $R^5O-$, $(R^{10}O)_2P(=O)-$ or $O=C=N-$, in which $R^3$ and $R^4$, independently of one another, are a hydrogen atom or monovalent, optionally substituted hydrocarbon radicals, the group $R^3R^4N-$ optionally in the form of a ring which may also contain other elements instead of carbon atoms, $R^5$ is an optionally substituted hydrocarbon radical or a radical $CH_3(C=CH_2)-(C=O)-$ or $CH_3-O-(C=O)-$, $R^{10}$, in each case independently is an optionally substituted hydrocarbon radical.

13. The composition of claim 1, which is an RTV-2 composition.

14. The composition of claim 1, wherein component A comprises a polydiorganosiloxane terminated with units of the formula (I).

15. The composition of claim 1, which is free of catalyst.

16. The composition of claim 1, which is free of tin catalyst.

17. A multicomponent RTV composition crosslinkable by condensation reaction comprising at least one component (A) and at least a component (B), components (A) and (B) separated from each other prior to use, wherein component (A) has at least one organosilicon compound (1) containing at least one unit of the formula $$[A-CR^1{}_2]_c SiR_a Y_b O_{(4-a-b-c)/2} \qquad (I)$$ 

in which
A are identical or different organic radicals bonded via nitrogen, oxygen, or phosphorus,
R are identical or different, monovalent, optionally substituted hydrocarbon radicals,
$R^1$ are identical or different and are a hydrogen atom or monovalent, optionally substituted hydrocarbon radical,
Y are identical or different and are hydrolyzable radicals,
a is 0, 1, 2 or 3,
b is 0, 1, 2 or 3, and
c is 0, 1 or 2, with the proviso that the sum of a+b+c is $\leq 4$ and the organosilicon compound (1) has at least one unit with c differing from 0 and at least two radicals Y,
and
component (B) contains at least one compound (2) having OH groups, selected from the group consisting of
(21) water and
(22) organosilicon compounds containing units of the formula $$R^2{}_x(OH)_y SiO_{(4-x-y)/2} \qquad (II),$$ 

in which
$R^2$ are identical or different and has a meaning stated for radical R,
x is 0, 1, 2 or 3, and
y is 0, 1, 2 or 3,
with the proviso that the sum of x+y is $\leq 4$ and organosilicon compound (22) has at least two OH groups.

* * * * *